US010051022B2

(12) United States Patent
N et al.

(10) Patent No.: US 10,051,022 B2
(45) Date of Patent: Aug. 14, 2018

(54) HOT ROOT STANDBY SUPPORT FOR MULTICAST

(71) Applicant: Juniper Networks, Inc., Sunnyvale, CA (US)

(72) Inventors: Vinod Kumar N, Bangalore (IN); Sudarsanan Codandam, Herndon, VA (US)

(73) Assignee: Juniper Networks, Inc., Sunnyvale, CA (US)

( * ) Notice: Subject to any disclaimer, the term of this patent is extended or adjusted under 35 U.S.C. 154(b) by 171 days.

(21) Appl. No.: 15/085,843

(22) Filed: Mar. 30, 2016

(65) Prior Publication Data
US 2017/0289216 A1    Oct. 5, 2017

(51) Int. Cl.
*H04L 29/06* (2006.01)
*H04L 12/723* (2013.01)
*H04L 12/707* (2013.01)
*H04L 12/703* (2013.01)

(52) U.S. Cl.
CPC .......... *H04L 65/4076* (2013.01); *H04L 45/22* (2013.01); *H04L 45/24* (2013.01); *H04L 45/28* (2013.01); *H04L 45/50* (2013.01)

(58) Field of Classification Search
CPC ......... H04L 45/22; H04L 45/24; H04L 45/28; H04L 45/50; H04L 65/4076; H04L 12/18; H04L 12/185; H04L 45/16; H04L 49/201
USPC .......................................................... 370/390
See application file for complete search history.

(56) References Cited

U.S. PATENT DOCUMENTS

| 8,310,957 | B1 * | 11/2012 | Rekhter | H04L 12/4641 370/256 |
| 8,339,973 | B1 * | 12/2012 | Pichumani | H04L 43/10 370/248 |
| 2005/0204042 | A1 * | 9/2005 | Banerjee | H04L 12/6418 709/226 |
| 2006/0088031 | A1 * | 4/2006 | Nalawade | H04L 12/185 370/390 |
| 2007/0025277 | A1 * | 2/2007 | Sajassi | H04L 45/00 370/256 |

(Continued)

OTHER PUBLICATIONS

Morin et al., "Multicast VPN fast upstream failover draft-ieff-bess-mvpn-fast-failover-00," Network Working Draft, Internet-Draft, Dec. 9, 2015, 17 pp.

(Continued)

*Primary Examiner* — Robert Lopata
(74) *Attorney, Agent, or Firm* — Shumaker & Sieffert, P.A.

(57) ABSTRACT

In general, techniques are described for providing Hot-Root Standby in Global Table Multicast (GTM) environments. For example, in such GTM environments, normally a single unicast route to the customer multicast source ("C-Source") will be available to egress provider edge (PE) routers. As described herein, ingress PE routers may advertise multiple routes to a C-Source, including unicast routes that include Route Import Extended Communities, which are imported by egress PE routers. This enables an egress PE router to have multiple paths to the C-Source, and the egress PE router may generate multiple C-multicast source tree joins for respective ingress PE routers in order to receive respective multicast streams sourced by the C-Source from the ingress PE routers.

20 Claims, 5 Drawing Sheets

(56) References Cited

U.S. PATENT DOCUMENTS

| | | | | |
|---|---|---|---|---|
| 2012/0099422 A1* | 4/2012 | Liu | ........................ | H04L 12/185 370/221 |
| 2013/0031271 A1* | 1/2013 | Bosch | .................... | H04W 40/36 709/245 |
| 2014/0003425 A1* | 1/2014 | Zhao | .................... | H04L 12/1836 370/390 |
| 2014/0112188 A1* | 4/2014 | Keesara | .................. | H04L 45/16 370/254 |
| 2014/0226531 A1* | 8/2014 | Farkas | ................. | H04L 41/0893 370/256 |
| 2015/0085644 A1* | 3/2015 | Kotalwar | ................. | H04L 45/28 370/228 |
| 2015/0288540 A1* | 10/2015 | Kotalwar | ............. | H04L 12/4679 370/254 |
| 2016/0134525 A1* | 5/2016 | Zhang | ................. | H04L 12/6418 370/392 |

OTHER PUBLICATIONS

Extended Search Report from counterpart European Application No. 17163923.0, dated Aug. 8, 2017, 9 pp.

Rosen et al., "Multicast in MPLS/BGP IP VPNs," Network Working Group Internet Draft, draft-ietf-13vpn-2547bis-mcast-10.txt, Jan. 28, 2010, 89 pp.

Rosen et al., "Multicast in MPLS/BGP IP VPNs," Network Working Group Internet Draft, draft-rosen-vpn-mcast-08.txt, Dec. 2004, 22 pp.

Zhang et al., "Global Table Multicast with BGP-MVPN Procedures," BESS Working Group Internet Draft, draft-ietf-bess-mvpn-global-table-mcast-02, Jul. 20, 2015, 22 pp.

Morin et al., "Multicast VPN fast upstream failover," Network Working Group Internet Draft, draft-morin-bess-mvpn-fast-failover-02, Jul. 6, 2015, 17 pp.

Walton et al., "Advertisement of Multiple Paths in BGP," Network Working Draft Internet Draft, draft-ietf-idr-add-paths-10, Oct. 24, 2014, 8 pp.

"Understanding JUNOS Next-Generation Multicast VPNs," Juniper Networks, Inc., Aug. 2009, 45 pp.

Rosen et al., "Multicast in MPLS/BGP IP VPNs," RFC 6513, Internet Engineering Task Force (IETF), Feb. 2012, 88 pp.

Aggarwal et al., "BGP Encodings and Procedures for Multicast in MPLS/BGP IP VPNs," RFC 6514, Internet Engineering Task Force (IETF), Feb. 2012, 59 pp.

Rosen et al., "BGP/MPLS IP Virtual Private Networks (VPNs)," RFC 4364, Network Working Group, Feb. 2006, 47 pp.

Response to Extended Search Report dated Oct. 9, 2017, from counterpart European Application No. 17163923.0, filed Apr. 4, 2018, 17 pp.

* cited by examiner

HOT ROOT STANDBY SUPPORT FOR MULTICAST

TECHNICAL FIELD

The disclosure relates to computer networks and, more particularly, to multicasting traffic over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Virtual private networks (VPNs) are often used to enable remotely located sources and receivers, e.g., remote customer sites, to share data. For example, a VPN may enable two or more remote customer sites, i.e., private networks, to securely share data over a public network, such as the Internet. In some cases, a VPN may be configured to support multicast traffic, such as Internet Protocol Television (IPTV), desktop conferences, corporate broadcasts, music and video web casts, and other forms of multimedia content. If a particular VPN is transmitting multicast traffic over the public network, it is referred to as a Multicast VPN (MVPN). Further details of MVPNs are described in Internet Draft, DRAFT-IETF-L3VPN-2547BIS-MCAST-10, "Multicast in MPLS/BGP IP VPNs," Internet Engineering Task Force, Jan. 28, 2010, and Internet Draft, DRAFT-ROSEN-VPN-MCAST-08, "Multicast in MPLS/BGP IP VPNs", December 2004, the entire contents of each of which are incorporated herein by reference.

For one or more MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source. As an example, the MVPN may use protocol independent multicast (PIM) as a multicast routing protocol to forward multicast traffic from sources to receivers or subscriber devices for particular multicast groups within the customer sites. PE routers communicate using PIM control messages, including join requests and prune requests, to propagate requests from receivers to join or leave a multicast group upstream toward the source of the multicast traffic and thereby build the multicast tree. PE routers may communicate with other PE routers within an autonomous system using an Interior Border Gateway Protocol (IBGP), and may communicate with routers outside the autonomous system using an Exterior Border Gateway Protocol (EBGP).

SUMMARY

In general, techniques are described for providing Hot-Root Standby in Global Table Multicast (GTM) environments. For example, in such GTM environments, normally a single unicast route to the customer multicast source ("C-Source") will be available to egress provider edge (PE) routers. As described herein, ingress PE routers may advertise multiple routes to a C-Source, including unicast routes that include Route Import Extended Communities, which are imported by egress PE routers. This enables an egress PE router to have multiple paths to the C-Source, and the egress PE router may generate multiple C-multicast source tree joins for respective ingress PE routers in order to receive respective multicast streams sourced by the C-Source from the ingress PE routers.

In some examples, the egress PE router generates, for each of a plurality of ingress PE routers on a path from the egress PE router to the C-Source, a C-multicast source tree join that includes an identifier (e.g., IP address) of the ingress PE router as the route distinguisher (RD) for the upstream ingress PE router. That is, rather than setting the upstream RD to zero, egress PE router includes an identifier of one of the ingress PE routers as the upstream RD. In some cases, the egress PE router draws the identifier from a Route Import Extended Community attribute included in a unicast route from the ingress PE router advertising a route to the C-Source. By including IP addresses or other identifiers for ingress PE routers as the upstream RDs, the egress PE router can distinguish between primary and backup C-multicast source tree joins based on Route Import Extended Community Values, which are used as upstream RDs while constructing Border Gateway Protocol (BGP) Multicast Virtual Private Network (MVPN) Routes. In this way, Hot-Root Standby can be enabled in GTM environments.

In some examples, the egress PE router generates a single C-multicast source tree join with a route distinguisher set to zero and with a list of multiple route targets identifying respective ingress PE routers for the multicast stream. A route target for a given ingress PE router may be included in a Route Import Extended Community in a unicast route advertised by the ingress PE router and received by the egress PE router, then added to the C-multicast source tree join. The egress PE router may advertise the C-multicast source tree join, which is received and imported by each of the ingress PE routers to cause each of the ingress PE routers to send multicast traffic for the C-source to the egress PE router, resulting in multiple multicast streams. In this way, Hot-Root Standby can be enabled in GTM environments.

In one example, a method includes receiving, by an egress PE router of a multi-protocol label switching (MPLS) network, a first unicast route to a source device of a customer site that is attached to a first ingress PE router and a second ingress PE router, the first unicast route originated by the first ingress PE router and having a route distinguisher value of zero. The method further includes receiving, by the egress PE router, a second unicast route to the source device, the second unicast route originated by the second ingress PE router and having a route distinguisher value of zero. The method also includes storing, by the egress PE router to a global routing table of the egress PE router, a first multicast source tree join route that specifies a customer-multicast flow sourced by the source device, the first multicast source tree join route having a first route distinguisher value. The method also includes storing, by the egress PE router to the global routing table of the egress PE router, a second multicast source tree join route that specifies the customer-multicast flow sourced by the source device, the second multicast source tree join route having a second route distinguisher value different than the first router distinguisher.

In another example, a method includes receiving, by an egress PE router of a MPLS network, a first unicast route to a source device of a customer site that is attached to a first ingress PE router and a second ingress PE router, the first unicast route originated by the first ingress PE router and having a route distinguisher value of zero. The method also includes receiving, by the egress PE router, a second unicast route to the source device, the second unicast route originated by the second ingress PE router and having a route distinguisher value of zero. The method also includes storing, by the egress PE router to a global routing table of the egress PE router, a multicast source tree join route that specifies a customer-multicast flow sourced by the source device, the multicast source tree join route having a route distinguisher value of zero and a plurality of route targets to cause each of the first ingress PE router and the second ingress PE router to import the multicast source tree join route when advertised by the egress PE router.

In another example, a PE router includes a forwarding unit coupled to one or more network interface cards. The PE router also includes a routing unit comprising at least one processor operably coupled to a memory, the routing unit configured to: receive a first unicast route to a source device that is attached to a first ingress PE router and a second ingress PE router, the first unicast route originated by the first ingress PE router and having a route distinguisher value of zero; receive a second unicast route to the source device, the second unicast route originated by the second ingress PE router and having a route distinguisher value of zero; store, to a global routing table, a first multicast source tree join route that specifies a customer-multicast flow sourced by the source device, the first multicast source tree join route having a first route distinguisher value; and store, to the global routing table, a second multicast source tree join route that specifies the customer-multicast flow sourced by the source device, the second multicast source tree join route having a second route distinguisher value different than the first route distinguisher.

In another example, a system includes a multicast source device of a first customer site; a multicast receiver device of a second customer site; an egress provider edge (PE) router on a multi-protocol label switching (MPLS) network and attached to the second customer site; and a first ingress PE router and second ingress PE router attached to the first customer site, wherein the egress PE router is configured to: receive a first unicast route to the multicast source device, the first unicast route originated by the first ingress PE router and having a route distinguisher value of zero; receive a second unicast route to the multicast source device, the second unicast route originated by the second ingress PE router and having a route distinguisher value of zero; store, to a global routing table, a first multicast source tree join route that specifies a customer-multicast flow sourced by the source device, the first multicast source tree join route having a first route distinguisher value; and store, to the global routing table, a second multicast source tree join route that specifies the customer-multicast flow sourced by the source device, the second multicast source tree join route having a second route distinguisher value different than the first route distinguisher.

The details of one or more examples are set forth in the accompanying drawings and the description below. Other features, objects, and advantages will be apparent from the description and drawings, and from the claims.

DETAILED DESCRIPTION

Figure 1:
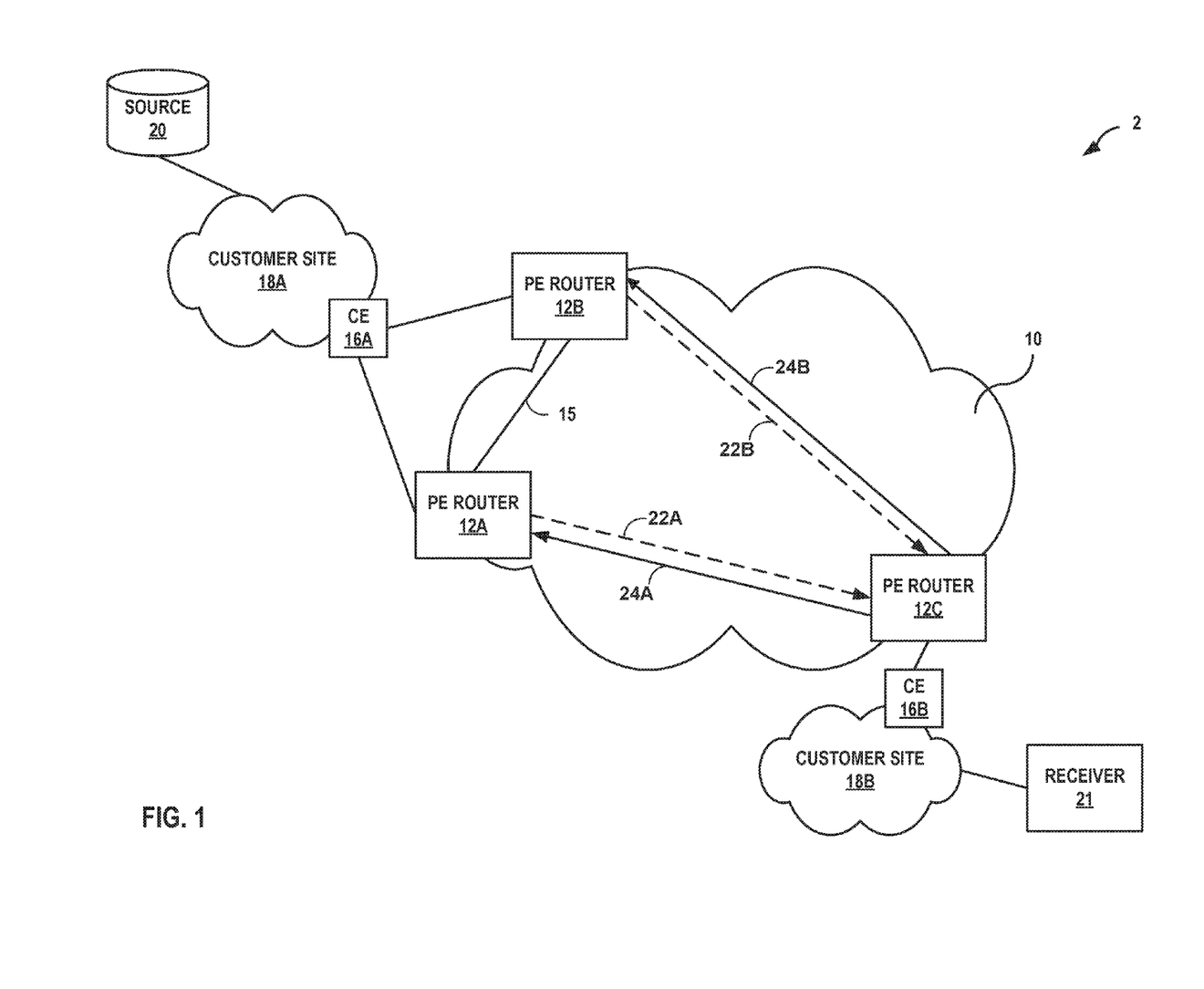
FIG. 1 is a block diagram illustrating an example system, in accordance with the techniques of this disclosure.

FIG. 1 is a block diagram illustrating an example system 2 in which provider edge (PE) routers 12A-12C (PE routers 12) are configured to operate in accordance with the techniques of this disclosure. System 2 includes an example computer network 10 in which PE routers 12 support Global Table Multicast (GTM) to provide multicast traffic between source 20 and receiver 21 associated with customer sites 18A-18B ("customer sites 18"). Although a single receiver 21 is shown in FIG. 1, any number of receivers may receive multicast traffic from source 20. Each of PE routers 12 couples to one or more customer sites 18 via customer edge (CE) routers 16A-16B ("CE routers 16"). In some examples, network 10 is referred to as a "core" network, and interfaces of PE routers 12 that couple to another PE router 12 may be referred to as "core-facing" interfaces.

Computer network 10, for example, may include an enterprise network, a campus network, a service provider network, a home network, or another autonomous system. In any of these examples, a remotely located source 20 and receiver 21 within customer sites 18 may share data via computer network 10. As one example of network 10 as an enterprise network, each of customer sites 18 may comprise one or more servers or employee computer terminals located in different regions of a single office location. As another example of network 10 as an enterprise network, each of customer sites 18 may comprise a remote office location of a corporation such that enterprise network 10 may be extended across a public network, such as the Internet. Although illustrated in FIG. 1 as an enterprise network or a service provider network, the techniques of this disclosure are applicable to other network types, both public and private. In some examples, computer network 10 may be coupled to one or more additional private or public networks, e.g., the Internet. In some cases, computer network 10 may comprise a multi-protocol label switching (MPLS) network. In the illustrated example, computer network 10 includes PE routers 12. Although not illustrated, network 10 may include additional edge routers and/or core routers not shown.

Each of customer sites 18 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, customer sites 18 may be configured to support multicast traffic for the delivery of, e.g., Internet Protocol Television (IPTV), desktop conferences, corporate broadcasts, music and video web casts, and other forms of multimedia content.

This disclosure describes techniques for providing Hot-Root Standby in Global Table Multicast (GTM) or MPLS Internet Multicast Environments, and the techniques may be particularly applicable to GTM that is based on "Global Table Multicast with BGP-MVPN Procedures," draft-ietf-bess-mvpn-global-table-mcast-02, BESS Working Group, Jul. 20, 2015, as well as "Multicast VPN fast upstream failover," draft-morin-bess-mvpn-fast-failover-02, Network Working Group, Jul. 6, 2015, the entire contents of each of which are incorporated herein by reference.

In the illustrated example, PE routers 12 may use Protocol-Independent Multicast (PIM) to set up transmission of multicast traffic through computer network 10 via a shared tree from remote multicast sources, such as source 20, to remote receivers or subscriber devices, such as receiver 21 reachable by customer site 18B. However, in other examples, any suitable multicast protocol may be used to set up transmission of multicast traffic through computer network 10.

For each rendezvous point (RP) router, a conceptual tree may be formed across computer network 10 to connect routers 12 that maintain state for multicast groups within the particular range. For example, in order to form the shared tree, one of routers 12 may select an upstream interface, i.e., a reverse path forwarding (RPF) interface, used to reach the rendezvous point (RP) router according to routing information stored on the router, and add it to shared tree 15. To illustrate, when PE router 12C receives a downstream join request from a local CE router, for example, from CE router 16B, PE router 12C examines the possible paths toward source 20. In the example of FIG. 1, PE router 12C has multiple upstream paths toward source 20, with PE router 12A and PE router 12B as upstream routers along the paths toward source 20. As further described below, PE router 12A and 12B use Border Gateway Protocol (BGP) Add-Paths procedures to ensure that multiple routes to C-Source are advertised in BGP, including unicast routes that include Route Import Extended Communities. To form the shared tree, PE router 12C may select the RPF interface, used to reach the RP router according to routing information stored on the router, and add it to shared tree 15.

RFC6513 entitled "Multicast in MPLS/BGP IP VPNs," February 2012, and RFC6514 entitled "BGP Encodings and Procedures for Multicast in MPLS/BGP IP VPNs," February 2012, the entire contents of each of which are incorporated herein by reference, describe protocols and procedures which a service provider may deploy in order to offer Multicast Virtual Private Network (Multicast VPN or MVPN) service to its customers. RFC6513 and RFC6514 extend the procedures of RFC4364 entitled "BGP/MPLS IP Virtual Private Networks (VPNs)," February 2006, the entire contents of each of which are incorporated herein by reference, to allow the service provider to provide multicast service to its VPN customers. The customer's multicast routing protocol (e.g., PIM) is used to exchange multicast routing information between a CE router and a PE router. The PE router stores a given customer's multicast routing information in the virtual routing and forwarding table (VRF) for that customer's VPN. BGP is used to distribute certain multicast-related control information among the PE routers that implement a VPN, and BGP may also be used to exchange the customer multicast routing information itself among the PE routers.

Customer multicast (C-multicast) routing information exchange refers to the distribution of customer PIM messages received from CE routers to other PE routers. In other words, C-multicast joins are exchanged between PE routers and refers to the propagation of C-multicast joins from receiver (or "egress") PE routers to source (or "ingress") PE routers. C-multicast routes may include shared tree join routes and source tree join routes. A shared tree join route is originated by receiver PE routers, such as PE router 12C.

The shared tree join route is originated when a PE router receives a shared tree C-multicast join (C-\*, C-G) through its interface connecting the PE router to the CE router, which indicates that a receiver behind the CE router has requested to receive the multicast stream. A source tree join route is originated by receiver PE routers. The source tree join route is originated when a PE router receives a source tree C-multicast join (C-S, C-G), which indicates that a receiver behind the CE router has requested to receive the multicast stream.

Multicast routing information that is not specific to a VPN is stored in a router's "global table," rather than in a VRF. Multicast that is outside the context of a VPN is known as Global Table Multicast or, more simply, Internet multicast. The procedures for GTM may be used to support multicast on the public Internet, but can also be used to support multicast streams that are not public, e.g., content distribution streams offered by content providers to paid subscribers. For GTM, multicast routing information is stored by routers to global tables rather than to VRFs.

In GTM, a multicast data stream from a CE router is tunneled over the core network from one or more ingress PE routers to one or more egress PE routers. Multicast routing information that a PE router learns from the CE routers attached to it is stored in the PE router's global table. The PE routers use BGP to distribute multicast routing and autodiscovery information among themselves. By supporting GTM using the BGP procedures designed for MVPN, a single control plane may govern the use of both VPN and non-VPN multicast.

MVPN uses BGP routes, defined in RFC 6514, that have a Subsequent Address Family Identifier (SAFI) value of 5, which are referred to as "MCAST-VPN routes." RFC 6514 defines the Network Layer Reachability Information (NLRI) format for MCAST-VPN routes. In some examples, the NLRI field begins with a "Route Type" octet, and may include a "Route Distinguisher" (RD) field. A route distinguisher is an address qualifier used within the MPLS network to maintain uniqueness among identical routes within virtual private network routes connected to the provider. In some examples, a VPN-IPv4 address is a 12-byte quantity, beginning with an 8-byte Route Distinguisher (RD) and ending with a 4-byte IPv4 address. If several VPNs use the same IPv4 address prefix, the PEs translate these into unique VPN-IPv4 address prefixes. The RD thus ensures that if the same address is used in several different VPNs, it is possible for BGP to carry several completely different routes to that address, one for each VPN.

Conventionally, as described in draft-ietf-bess-mvpn-global-table-mcast-02, when a PE originates a MCAST-VPN route in support of GTM, the RD field (for those routes types where it is defined) of that route's NLRI must be set to zero (i.e., to 64 bits of zero). Since no VRF may have a RD of zero, this allows MCAST-VPN routes for GTM to be distinguished from MCAST-VPN routes for VPNs. However, because draft-ietf-bess-mvpn-global-table-mcast-02 specifies that the RD field (for those routes types where it is defined) of the MCAST-VPN route's NLRI must be set to zero, Hot Root Standby (Multicast Live-Live) is not supported for MPLS Internet Multicast/Global Table Multicast in the current draft-ietf-bess-mvpn-global-table-mcast-02 specification. Techniques of this disclosure provide Hot Root Standby (Multicast Live-Live) in MPLS Internet Multicast/Global Table Multicast environments.

Hot-Root Standby (Multicast Live-Live) in non-GTM environments is described in section 5 of draft-morin-bess-mvpn-fast-failover-02. In Hot Root Standby (Multicast Live-Live) in non-GTM environments, for a particular VRF (or possibly only for a said source (i.e., C-S) and receiver (i.e., C-G)), the downstream PE routers advertise a Standby BGP customer multicast (C-multicast) route as described in section 4 of draft-morin-bess-mvpn-fast-failover-02. The upstream PE routers use the "hot standby" behavior and thus will forward traffic for a said multicast state as soon as they have either a (primary) BGP C-multicast route or a Standby BGP C-multicast route for that state (or both). The downstream PE routers accept traffic from the primary or standby tunnel, based on the status of the tunnel, as described in section 4 of draft-morin-bess-mvpn-fast-failover-02.

Conventional, non-GTM Hot Root Standby using VPNs distinguishes between primary and backup C-multicast joins (Type-7/6 MCAST-VPN NLRI) based on upstream RD values. C-multicast joins are translated into BGP C-multicast MVPN routes and advertised via BGP MCAST-VPN address family towards the source PE routers. Type 6 C-multicast routes and Type 7 C-multicast routes are two types of C-multicast MVPN routes. Type 6 C-multicast routes are used in representing information contained in a shared tree (C-*, C-G) join. Type 7 C-multicast routes are used in representing information contained in a source tree (C-S, C-G) join. In a multi-homed scenario, C-source unicast routes advertised by upstream PE routers must have different RD values. The downstream egress PE router would then use the upstream RD values to construct a primary C-multicast join route and a backup C-multicast join route. However, Hot Root Standby (Multicast Live-Live) is not supported for GTM because the upstream RD value, as described in draftietf-bess-mvpn-global-table-mcast-02, is always assumed to be zero for all PE routers in GTM.

Techniques of this disclosure provide for Hot Root Standby in GTM environments. In such GTM environments, normally a single unicast route to the C-Source will be available to the egress PE routers. As defined in section 2.3.4 of draft-ietf-bess-mvpn-global-table-mcast-02, BGP Add-Paths procedures ensure that multiple routes (of SAFI 1, 2 or 4) to C-Source are advertised in BGP, including unicast routes that include Route Import Extended Communities. Upon importing the multiple routes to the C-Source, the egress PE router would now have multiple paths to C-Source (Multicast Source). BGP Add-Paths procedures refer to BGP extensions that permit advertising multiple paths for the same address prefix, and are described in "Advertisement of Multiple Paths in BGP," draft-ietf-idr-add-paths-10, Network Working Group of the Internet Engineering Task Force, Oct. 24, 2014, which is incorporated by reference herein in its entirety. The essence of the extensions is that each path is identified by a path identifier and the address prefix.

In the example of FIG. 1, PE routers 12A and 12B each advertise unicast routes 22A, 22B, respectively, to PE router 12C that include Route Import Extended Communities, as described in draft-ietf-bess-mvpn-global-table-mcast-02. Each of unicast routes 22A, 22B may be generated and advertised in accordance with BGP Add-Path procedures as described above. A Route Import Extended Community includes, among other information, an identifier that uniquely identifies the source of the unicast route that includes the Route Import Extended Community. One such Route Import Extended Community may include VRF route import extended communities (commonly referred to as rt-import). The VRF route import extended community is an IP-address-specific extended community that is used for importing C-multicast routes in the PE router's VRF table to which the source is attached. The PE routers in the network may exchange VRF route import extended communities for each VPN route. For example, PE router 12C may advertise C-multicast MVPN routes with the VRF route import extended community, and PE router 12B imports the C-multicast MVPN routes with the VRF route import extended community if the C-multicast MVPN routes matches the VRF route import extended community originated by PE router 12B. In other words, PE router 12C may create a unique VRF route import extended community and advertise local VPN routes to PE router 12B. PE router 12C attaches VRF route import extended community to these routes to which PE router 12B may install the VPN routes they learned from PE router 12C in its unicast route tables. In some examples, the unique identifier is an Internet Protocol (IP) address of the source; however, the unique identifier could be another router identifier.

In FIG. 1, PE router 12C may receive the unicast route 22A with a VRF Route Import Extended Community from PE router 12A that specifies the IP address for router 12A. PE router 12C may also receive the unicast route 22B with a VRF Route Import Extended Community from PE router 12B that specifies the IP address for router 12B. As part of configuring Hot-Root Standby for GTM in system 2, PE router 12C stores unicast routes 22A, 22B to a global table of PE router 12C. A global table stores multicast routing information that is not specific to particular VPNs, as described in draft-ietf-bess-mvpn-global-table-mcast-02. Therefore, the forwarding information for multicast routing information that is not specific to a particular VPN may not be stored in a VRF, but rather in the global table. In some examples, the global table in each policy-based routing (PBR) may be configured with a set of export route targets to be attached to MCAST-VPN routes that are originated to support GTM, and/or (b) with a set of import route targets (RTs) for GTM. Based on the unicast routes 22A, 22B, PE router 12C determines at least two upstream routers, such as PE router 12A and PE router 12B, that may service requests for multicast traffic using GTM for system 2. PE router 12C would now have multiple paths 24A, 24B to source 20 (Multicast Source).

Receiver 21 may initiate a request to receive multicast traffic from source 20. PE router 12C may be operating in Hot-Root Standby mode. PE router 12C may receive a join request (e.g., C-multicast join that specifies (C-S, C-G)) from CE router 16B to request a multicast stream. In some examples, the join request may request a multicast flow by specifying a (source, group) tuple where the source is the IP address of the sender, i.e., egress PE router 12C, and the group is the IP multicast group address of the destination, i.e., ingress PE routers 12A, 12B. Since PE router 12C is operating in Hot-Root Standby mode, PE router 12C performs a route lookup to the C-Source, i.e., source 20, in the global table to identify source 20 as reachable via both PE routers 12A, 12B based on the unicast routes 22A, 22B. In other words, PE router 12C determines that multicast streams responsive to the join request from CE router 16B may be received from both PE routers 12A, 12B.

In accordance with techniques of the disclosure, upon determining that both PE routers 12A, 12B may forward a multicast stream for the join request, PE router 12C may generate C-multicast source tree joins 24A for import by PE router 12A and generate C-multicast source tree joins 24B for import by PE router 12B.

PE router 12C may generate C-multicast source tree join 24A to include a route distinguisher that includes an identifier of PE router 12A to cause PE router 12A to receive and import the C-multicast source tree join 24A. In some examples, the identifier of PE router 12A is obtained by PE router 12C from unicast route 22A and, more specifically in some instances, from the VRF Route Import Extended Community for unicast route 22A that specifies an identifier (e.g. and IP address) for PE router 12A.

PE router 12C may also generate C-multicast source tree join 24B to include a route distinguisher that includes an identifier of PE router 12B to cause PE router 12B to receive and import the C-multicast source tree join 24B. In some examples, the identifier of PE router 12B is obtained by PE router 12C from unicast route 22B and, more specifically in some instances, from the VRF Route Import Extended Community for unicast route 22B that specifies an identifier (e.g. and IP address) for PE router 12B.

Accordingly, rather than setting the upstream RD to zero as specified in draft-ietf-bess-mvpn-global-table-mcast-02, PE router 12C includes an identifier for PE router 12A as the upstream RD for C-multicast source tree join 24A and includes an identifier for PE router 12B as the upstream RD for C-multicast source tree join 24B. By specifying separate upstream RDs for joins 24A, 24B, PE router 12C can distinguish between and advertise separate primary and backup C-multicast source tree joins based on Route Import Extended Community values which are used as RDs for the upstream PE routers 12A, 12B for generating Type-6/Type-7 BGP MVPN Routes. In this way, Hot-Root Standby can be enabled for GTM in system 2.

In the example of FIG. 1, PE router 12C outputs the C-multicast source tree join routes 24A and 24B, which are imported by PE routers 12A and 12B, respectively. An example structure of the C-multicast source tree join route is as follows:

MVPN Route Type:RD of Upstream PE:AS of Upstream PE:C-S Length:C-S:C-G Length:C-G, where, in some examples, RD of Upstream PE is from a Route Import Extended Community received in the corresponding unicast route 22A, 22B from the upstream ingress PE 12A, 12B for the join 24A, 24B.

Each of C-multicast source tree join routes 24A, 24B may be advertised including respective Route Target values having values from the respective Route Import Extended Community values of unicast routes 22A, 22B to cause respective PE routers 12A, 12B to import respective routes 24A, 24B. That is, PE router 12A imports C-multicast source tree join route 24A and PE router 12B imports C-multicast source tree join route 24B.

PE routers 12A and 12B may each determine the upstream RD value included in the C-multicast source tree join routes 24A, 24B to determine whether the upstream RD value (e.g., IP address) matches the IP address of the respective PE router. In the example of FIG. 1, PE router 12B may determine that the upstream RD value in the C-multicast source tree join route 24B matches the IP address of PE router 12B and therefore may generate and send a subsequent C-multicast source tree join route to CE router 16A. CE router 16A may send a subsequent C-multicast source tree join route to source 20. In response to receiving the C-multicast source tree join route, source 20 may send the requested multicast stream to CE router 16A, which in turn sends the multicast stream to PE router 12B. PE router 12B may send the multicast stream to PE router 12C, which in turn forwards the stream to CE router 16B. Receiver 21 may receive the multicast stream from CE router 16B. PE router 12A may operate similarly with respect to C-multicast source tree join route 24A to receive the multicast stream and forward the multicast stream to PE router 12C.

In an alternative technique, rather than setting the upstream RD value to an identifier of the upstream PE (e.g., IP address of upstream PE), PE router 12C sets the upstream RD of the C-multicast source tree join route to zero. However, PE router 12B includes a route target (RT) list in the C-multicast source tree join route, where the RT list includes the Route Import Extended Community values from multiple upstream PE routers as indicated in unicast routes 22A, 22B. For instance, in FIG. 1, if the global table of PE router 12C includes IP addresses of both of PE routers 12A and 12B that are associated with source 20, then PE router 12C may include both the IP addresses of PE routers 12A and 12B in the RT list of the C-multicast source tree join route. PE router 12C may send the C-multicast source tree join route with the RT list to each of PE routers 12A and 12B.

In either of the examples above (e.g., non-zero RD value or using an RT list), each of PE routers 12A and 12B may receive the multi-cast stream from source 20. PE routers 12A and 12B may each send the multicast stream to PE router 12C. PE router 12C may inspect MPLS labels attached to respective packets in the multicast stream and forward the packets to CE router 16B if the MPLS label matches a forwarding rule installed in PE router 12C. For instance, the forwarding rule may specify that only the packets in the multicast stream matching the MPLS label for the primary PE, e.g., PE router 12B are forwarded to receiver 21. In other example, the forwarding rule may specify that only the packets in the multicast stream matching the MPLS label for the backup PE, e.g., PE router 12A are forwarded to receiver 21. In this way, if PE router 12C receives network packets with duplicate payloads because the multicast stream is sent by both PE routers 12A and 12B to PE router 12C, then PE router 12C may send only one instance of the packet with the payload to CE router 16B. If the active multicast stream from PE router 12A fails, PE router 12C may failover to the backup multicast stream from PE router 12B. In some examples, PE router 12C may failover as described in "Multicast VPN fast upstream failover," referenced above. As described above, the various techniques can provide Hot-Root Standby in GTM environments.

Figure 2:
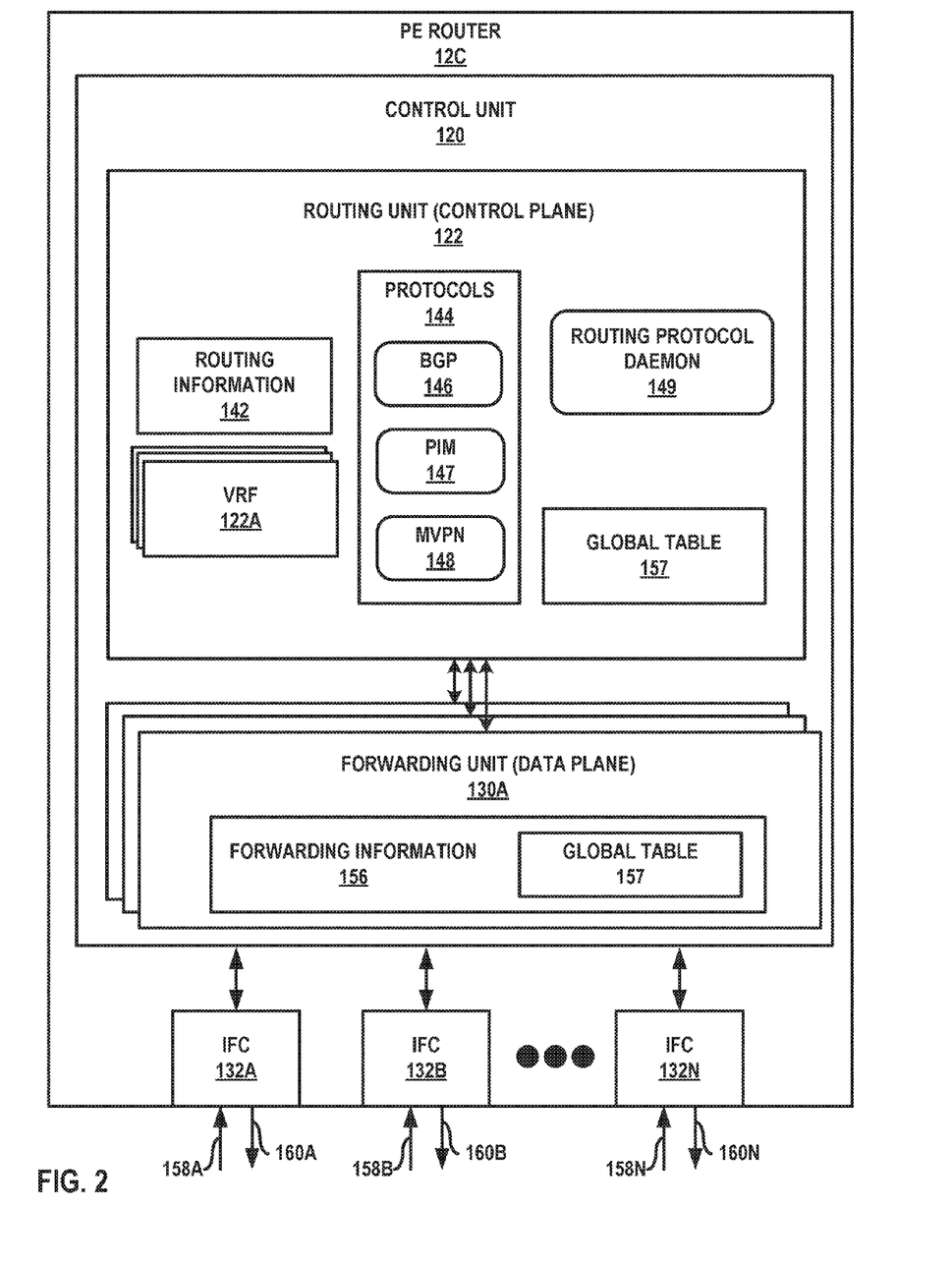
FIG. 2 is a block diagram illustrating further details of a network device that implements techniques of the disclosure.

FIG. 2 is a block diagram illustrating further details of a network device that implements techniques of the disclosure. PE router 12C of FIG. 2 may represent an example instance of PE router 12C of FIG. 1. PE router 12C includes a control unit 120 that includes a routing unit 122 coupled to a forwarding unit 130A-130N. PE 12C includes interface cards 132A-132N ("IFCs 132") that receive packets via inbound links 158A-158N ("inbound links 158") and send packets via outbound links 160A-160N ("outbound links 160"). IFCs 132 are typically coupled to links 158, 160 via a number of interface ports (not shown). Inbound links 158 and outbound links 160 may represent physical interfaces, logical interfaces, or some combination thereof.

Routing unit 122 provides an operating environment for various protocols 144 that execute at different layers of a network stack. The protocols may be software processes executing on one or more processors. For example, routing unit 122 includes network protocols that operate at a network layer of the network stack. In the example of FIG. 2, network protocols include the Border Gateway Protocol (BGP) 146, which is a routing protocol. Routing unit 122 may include other protocols not shown in FIG. 2. Routing unit 122 is responsible for the maintenance of routing information 142 to reflect the current topology of a network and other network entities to which PE router 12C is connected. In particular, routing protocols periodically update routing information 142 to accurately reflect the topology of the network and other entities based on routing protocol messages received by PE router 12C.

As shown in the example of FIG. 2, protocols 144 may also include PIM 147. PIM 147 may represent the PIM protocol, which may operate in one or more modes, such as Dense Mode (DM), Sparse Mode (SM), Source-Specific Mode (SSM), and Bidirectional Mode (BIDIR). PE router 12C also includes MVPN 148, which may implement one or more of the techniques described in draft-ietf-bess-mvpn-global-table-mcast-02 and/or draft-morin-bess-mvpn-fast-failover-02. As shown in FIG. 2, PE router 12C may implement VRF 122A. VRF 122A logically represents a virtual routing and forwarding table (or instance). Routing protocol daemon 149 manages multiple VRFs 122 and global table 157 within PE router 12C. An attachment circuit may be associated with a particular VRF, such as VRF 122A, and the particular VRF may be configured to forward traffic for the attachment circuit. In some examples, VRF 122A may represent multiple VRF instances. In some examples, the multiple VRF instances may correspond to multiple different attachment circuits.

Routing protocol daemon (RPD) 149 may execute protocols 144 to exchange routing information, stored in routing information 142, with other routers. Routing information 142 may include information defining a topology of a network. RPD 149 may resolve the topology defined by routing information in routing information 142 to select or determine one or more routes through the network. RPD 149 may then generate forwarding information 156 for installation to forwarding units 30.

Forwarding units 130A-130N ("forwarding units 130") represent hardware and logic functions that provide high-speed forwarding of network traffic. Forwarding units 130 typically includes a set of one or more forwarding chips (sometimes referred to as "forwarding engines") programmed with forwarding information that maps network destinations with specific next hops and the corresponding output interface ports. In general, when PE router 12C receives a packet via one of inbound links 158, one of forwarding units 130 identifies an associated next hop for the data packet by traversing the programmed forwarding information based on information within the packet. One of forwarding units 130 (either the ingress forwarding engine or a different egress forwarding engine) forwards the packet on one of outbound links 160 mapped to the corresponding next hop.

In the example of FIG. 2, forwarding unit 130A includes forwarding information 156. In accordance with routing information 42, forwarding unit 130A maintains forwarding information 156 that associates network destinations with specific next hops and corresponding interface ports. For example, routing unit 122 analyzes routing information 142 and generates forwarding information 156 in accordance with routing information 142. Forwarding information 156 may be maintained in the form of one or more tables, link lists, radix trees, databases, flat files, or any other data structures. In accordance with techniques of this disclosure, forwarding information 156 may include a global table 157 as described in FIG. 1. Global table 157 is not associated with any particular VPN and may include multicast routing information for GTM, rather than for a particular VPN.

In accordance with techniques of the disclosure, forwarding unit 130A may initially receive, via one of IFCs 132, a unicast route with a Route Import Extended Community from PE router 12A that specifies the IP address for PE router 12A. Forwarding unit 130A may also receive, via one of IFCs 132, a unicast route with a Route Import Extended Community from PE router 12B that specifies the IP address for PE router 12B. Forwarding unit 130A may send the unicast route information to RPD 149. RPD 149 may determine that the unicast route information is not associated with any particular VPN and may store the unicast routes to global table 157, including the respective Route Import Extended Community attributes.

Receiver 21 may later initiate a request to receive multicast traffic from source 20 while PE router 12C is operating in Hot-Root Standby mode. PE router 12C may receive a join request from CE router 16B to request a multicast stream. As described in FIG. 1, the join request may request a multicast flow by specifying a (source, group) tuple where the source is the IP address of the sender, i.e., egress PE router 12C, and the group is the IP multicast group address of the destination, i.e., ingress PE routers 12A, 12B. Since PE router 12C is operating in Hot-Root Standby mode, forwarding unit 130A performs a route lookup to the C-Source, i.e., source 20. Forwarding unit 130A may retrieve a value of the Route Import Extended Community attribute associated with source 20 from global table 157. For instance, PE router 12C may retrieve the IP addresses of PE routers 12A and 12B from the unicast routes to source 20 stored to global table 157.

Upon retrieving the identifiers of PE routers 12A and 12B, RPD 149 executing BGP 146 may generate a first C-multicast source tree join that includes the identifier (e.g., IP address) of PE router 12B as the upstream RD. Forwarding unit 130A may also generate a second C-multicast source tree join that includes the identifier (e.g., IP address) of PE router 12A as the upstream RD. Rather than setting the upstream RD to zero as specified in draft-ietf-bess-mvpn-global-table-mcast-02, forwarding unit 130A includes the respective IP addresses of PE routers 12A and 12B as the respective upstream RDs for respective C-multicast source tree joins. By including the IP addresses of PE routers 12A and 12B as the upstream RDs, respectively, PE router 12C can distinguish between primary and backup C-multicast source tree joins and thus receive multiple multicast streams from the ingress PE routers 12A, 12B.

Forwarding unit 130A sends the first and second C-multicast source tree join routes to PE routers 12A and 12B. PE routers 12A and 12B may each determine the upstream RD value included in the C-multicast source tree join routes to determine whether the upstream RD value (e.g., IP address) matches the IP address of the respective PE router. In the example of FIG. 1, PE router 12B may determine that the upstream RD value in the C-multicast source tree join route matches the IP address of PE router 12B and therefore may generate and send a subsequent C-multicast source tree join route to CE router 16A. CE router 16A may send a subsequent C-multicast source tree join route to source 20. In response to receiving the C-multicast source tree join route, source 20 may send the requested multicast stream to CE router 16A, which in turn sends the multicast stream to PE router 12B. PE router 12B may send the multicast stream to PE router 12C, which in turn forwards the stream to CE router 16B. Receiver 21 may receive the multicast stream from CE router 16B.

In the alternative technique as described in FIG. 1, rather than setting the upstream RD value to an identifier of the upstream PE (e.g., IP address of upstream PE), forwarding unit 130A generates C-multicast source tree join routes for each of PE routers 12A and 12B and sets the respective upstream RDs of the C-multicast source tree join routes to zero. Forwarding unit 30A includes a route target (RT) list in each of the C-multicast source tree join routes, where the RT list includes the Route Import Extended Community values of the unicast routes to source 20 on respective path through PE routers 12A and 12B. For instance, if global table 157 includes IP addresses of both of PE routers 12A and 12B that are each associated with source 20, then forwarding unit 130A may include both the IP addresses of PE routers 12A and 12B in the RT list of the C-multicast source tree join routes. Forwarding unit 130A may send the C-multicast source tree join route with the RT list to each of PE routers 12A and 12B.

As described in FIG. 1, in either of the examples above (e.g., non-zero RD value or using an RT list), each of PE routers 12A and 12B may receive the multi-cast stream from source 20. PE routers 12A and 12B may each send the multicast stream to PE router 12C. Forwarding unit 130A may inspect MPLS labels attached to respective packets in the multicast stream and forward the packets to CE router 16B if the MPLS label matches a forwarding rule installed in forwarding information 156. For instance, the forwarding rule may specify that only the packets in the multicast stream matching the MPLS label for the primary PE, e.g., PE router 12B are forwarded to receiver 21. In this way, if forwarding unit 130A receives network packets with duplicate payloads because the multicast stream is sent by both PE routers 12A and 12B to PE router 12C, then PE router 12C may send only one instance of the packet with the payload to CE router 16B.

Elements of routing unit 122 may be implemented solely in software, or hardware, or may be implemented as combinations of software, hardware, or firmware. For example, routing unit 122 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of routing unit 122 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 12C, e.g., protocols. Routing unit 122, in some examples, retrieves and executes the instructions from memory for these aspects.

Figure 3A:
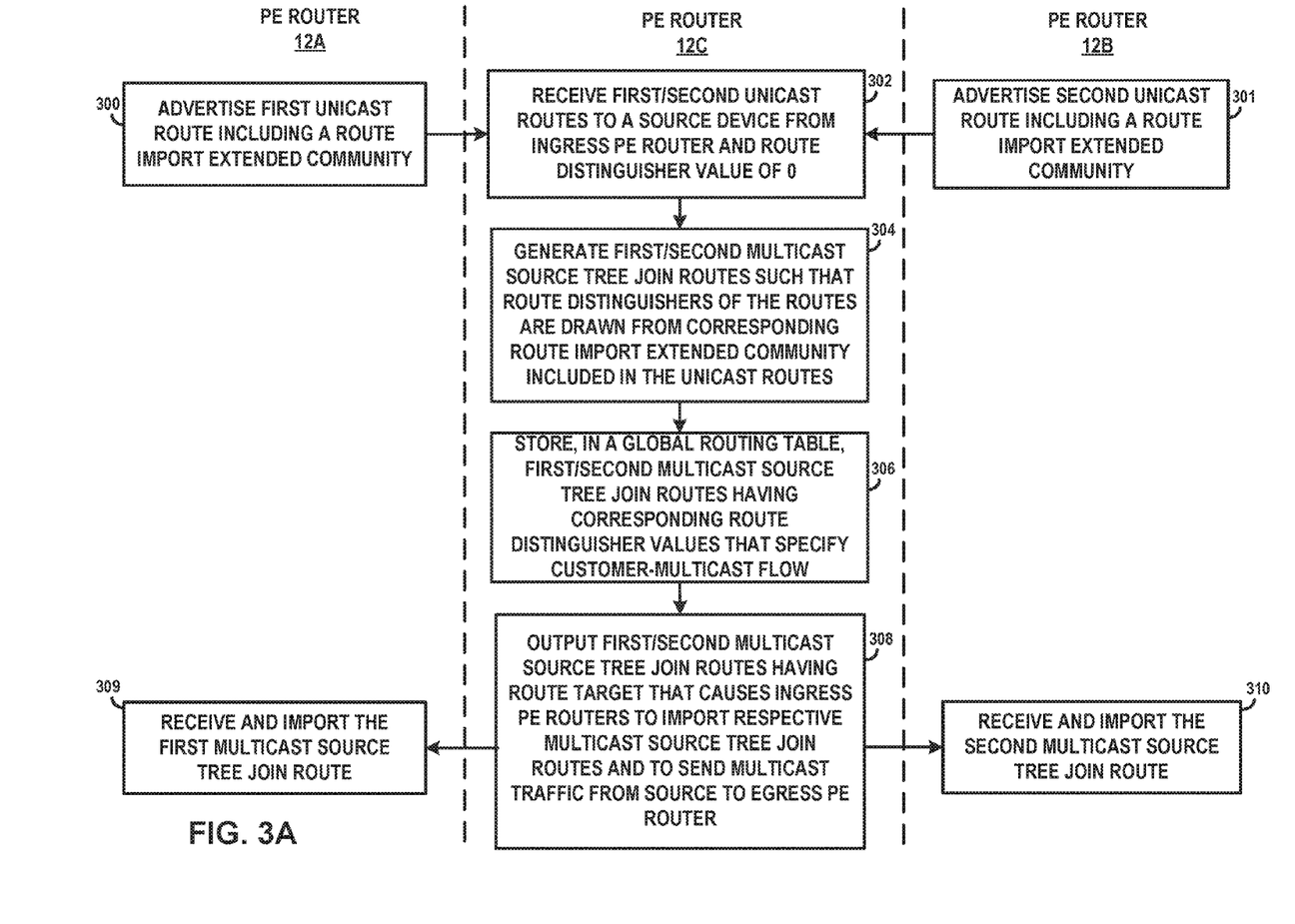
FIGS. 3A-3B are flowcharts illustrating example operation of network devices in accordance with the techniques of this disclosure.
Figure 3B:
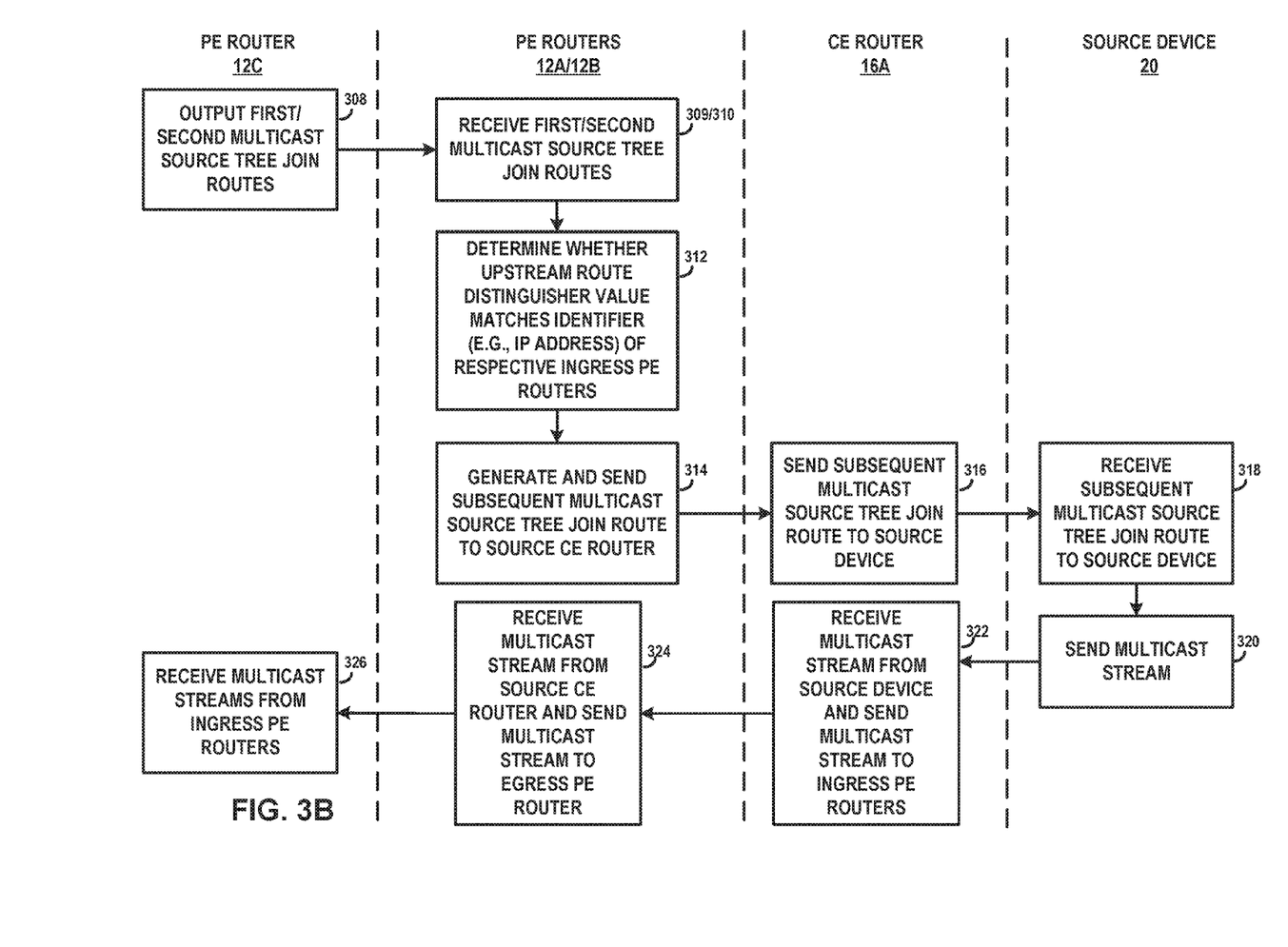

FIGS. 3A-3B are flowcharts illustrating example operation of network devices in accordance with the techniques of this disclosure. FIGS. 3A-3B illustrates an example operation of devices for providing hot-root standby support for MPLS Internet Multicast/Global Table Multicast. FIGS. 3A-3B will be described for purposes of example with respect to PE routers 12A-12C in the example system 2 of FIG. 1 and FIG. 2. In the example of FIG. 3A, PE router 12C may receive unicast routes to a source device from ingress PE routers, including Route Import Extended Communities that include, among other information, identifiers that uniquely identify the sources of the unicast routes. For example, PE router 12A may advertise to PE router 12C a unicast route with a Route Import Extended Community that specifies a unique identifier (e.g., IP address) for PE router 12A (300). PE router 12B may also advertise to PE router 12C a unicast route with a Route Import Extended Community that specifies a unique identifier for PE router 12B (301). Egress PE router 12C may receive the unicast routes to the source device 20 from ingress PE routers 12A and 12B (302). As stated above, when a PE router originates a MCAST-VPN route in support of Global Table Multicast (GTM), the Route Distinguisher (RD) field of that route's Network Layer Reachability Information (NLRI) must be set to zero (i.e., to 64 bits of zero). In the example of FIG. 3, PE router 12C may receive the unicast routes from ingress PE routers 12A and 12B that have a RD value of zero.

PE router 12C may then generate multicast source tree join routes such that Route Distinguishers of the routes are drawn from corresponding Route Import Extended Community values included in the unicast routes (304). For example, a unicast route advertised from PE router 12A may include Route Import Extended Community value that specifies a unique identifier for PE router 12A. The Route Import Extended Community value included in the advertised unicast route from PE router 12A may be used to generate a first multicast source tree join having the Route Distinguisher value drawn from the Route Import Extended Community value included in the unicast route originated by PE router 12A. Likewise, a unicast route advertised from PE router 12B may include Route Import Extended Community value that specifies a unique identifier for PE router 12B. The Route Import Extended Community value included in the advertised unicast route from PE router 12B may be used to generate a second multicast source tree join having the Route Distinguisher value drawn from the Route Import Extended Community value included in the unicast route originated by PE router 12B.

PE router 12C may store multicast source tree join routes for PE routers 12A and 12B that specify the customer-multicast flow sourced by source device 20 (306). In one example, the multicast source tree join route for PE router 12A may have a first RD value, and the multicast source tree join route for PE router 12B may have a second RD value different than the first RD value. The multicast source tree join routes may be stored in a global routing table of the egress PE router, such as PE router 12C.

Egress PE router 12C may output the multicast source tree join routes having a route target that causes the ingress PE routers to import respective multicast source tree join routes and to send multicast traffic from the source device 20 to egress PE router 12C (308). For example, PE router 12C may output a first multicast source tree join route to ingress PE router 12A. In the example of FIG. 3, the first multicast source tree join route may have a route target that causes ingress PE router 12A to import the first multicast source tree join route to a global table of PE router 12A and send a first multicast traffic from the source device 20 to PE router 12C. Similarly, PE router 12C may output a second multicast source tree join route to ingress PE router 12B. The second multicast source tree join route may have a route target that causes ingress PE router 12B to import the second multicast source tree join route to a global table of PE router 12B and send a second multicast traffic from the source device 20 to PE router 12C.

Ingress PE routers may receive the corresponding multicast source tree join routes from egress PE router 12C. For example, ingress PE router 12A may receive the first multicast source tree join route from egress PE router 12C (309). Likewise, ingress PE router 12B may receive the second multicast source tree join route from egress PE router 12C (310). In this way, egress PE router may be configured to operate in Hot-Standby Mode in a Global Table Multicast Network.

After PE routers 12A and 12B receive the respective multicast source tree join routes, ingress PE routers 12A or 12B may determine whether an upstream route distinguisher value matches the identifier of the respective identifier of the ingress PE routers (e.g., IP address), as shown in FIG. 3B (312).

If the upstream route distinguisher value matches the identifier of the respective identifier of the ingress PE routers, ingress PE routers 12A or 12B may each generate and send a subsequent multicast source tree join route to source CE router 16A (314). The source CE router 16A may send a subsequent multicast source tree join route to source device 20 (316). In response to receiving the multicast source tree join route (318), source device 20 may send the requested multicast stream to CE router 16A (320). CE router 16A receives the multicast stream from source device 20 and sends the multicast stream to ingress PE routers 12A and 12B (322). The ingress PE routers 12A, 12B each receive and send the duplicate multicast stream to egress PE router 12C (324), which in turn may forward the active or backup multicast stream to CE router 16B to send to receiver 21 (226). An example of the above method is as follows:

C-Source Unicast Routes on Egress PE (12C)

```
regress@PE12C# run show route 181.181.181.2 ! C-Source
inet.0: 68 destinations, 85 routes (67 active, 0 holddown, 1 hidden)
+ = Active Route, - = Last Active, * = Both
181.181.181.0/30 *[BGP/170] 14:12:25, localpref 100, from
10.255.162.151
AS path: 100 I, validation-state:
unverified
> to 52.52.52.1 via ge-1/2/0.0, label-switched-path PE12C_to_PE12A
[BGP/170] 10:16:32, localpref 100, from 10.255.162.157
AS path: 100 I, validation-state:
unverified
> to 51.51.51.1 via ge-1/1/2.0, label-switched-path PE12C_to_PE12B
regress@PE12C# run show route 181.181.181.2 extensive
inet.0: 68 destinations, 85 routes (67 active, 0 holddown,
1 hidden.)
181.181.181.0/30 (2 entries, 1 announced)
TSI:
KPT in-kernel 181.181.181.0/30 -> {indirect(1048579)}
Page 0 idx 0, (group CE12C type External) Type 1 val
0xa6ca944 (adv_entry)
   Advertised metrics:
     Nexthop: Self
     AS path: [65000] 100 I
     Communities: src-as:65000:0 rt-import: 10.255.162.151:0
Path. 181.181.181.0 from 10.255.162.151 Vector len 4. Val:
0
       *BGP Preference: 170/-101
       Next hop type: Indirect, Next hop index: 0
       Address: 0xa5cd570
       Next-hop reference count: 6
       Source: 10.255.162.151
       Next hop type: Router, Next hop index: 630
       Next hop: 52.52.52.1 via ge-1/2/0.0,
selected.
         Label-switched-path PE12C_to_PE12A
         Label element ptr: 0xa5d1160
         Label parent element ptr: 0x0
         Label element references: 2
         Label element child references: 0
         Label element lsp id: 3
         Session Id: 0x2964
         Protocol next hop: 1.1.11.2
         Indirect next hop: 0xa6f1a80 1048579 INH
Session ID: 0x2970
       State: <Active Int Ext.>
       Local AS: 65000 Peer AS: 65000
       Age: 14:12:35 Metric2: 1
       Validation State: unverified
       Task: BGP_65000.10.255.162.151
       Announcement bits (3): 0-KRT 6-
BGP_RT_Background 7-Resolve tree 2
       AS path: 100 I
       Communities: src-as:65000:0 rt-import:10.255.162.151:0
       Accepted
       Localpref: 100
       Router ID: 10.255.162.151
       Indirect next hops: 1
         Protocol next hop: 1.1.11.2 Metric:
1
         Indirect next hdp: 0xa6f1a80
   1048579 INH Session ID: 0x2970
         Indirect path forwarding next hops:
1
         Next hop type: Router
         Next hop: 52.52.52.1 via
ge-1/2/0.0
         Session Id: 0x2964
       1.1.11.0/30 Originating RIB: inet-0
         Metric: 1 Node path. count: 1
         Indirect nexthops: 1
           Protocol Nexthop: 10.255.162.151 Metric.: 1
           Indirect. nexthop: 0xa6ef780 1048582 INH
Session ID: 0x2960 Path forwarding nexthops link.:
0xb922690
         Path inh link: 0x0
         Indirect path forwarding nexthops: 1
           Nexthop: 52.52.52.1
via ge-1/2/0.0
       BGP Preference: 170/-101
       Next hop type: Indirect, Next hop index: 0
       Address: 0xa5cfc70
       Next-hop reference count: 3
       Source: 10.255.162.157
       Next hop type: Router, Next hop index: 631
Next hop: 51.51.51.1 via ge-1/1/2.0,
selected
         Label-switched-path PE12C_to_PE12B
         Label element ptr: 0xa5c6180
         Label parent element ptr: 0x0
         Label element references: 2
         Label element child references: 0
         Label element lsp id: 2
         Session Id: 0x2957
         Protocol next hop: 1.1.1.2
         Indirect next hop: 0xa6f1d00 - INH Session
ID: 0x0
       State: <NotBest Int Ext>
       Inactive reason: Not Best in its group -
Router ID
       Local AS: 65000 Peer AS: 65000
       Age: 10:16:42 Metric2: 1
       Validation State: unverified
       Task: BGP_65000.10.255.162.157
       AS path: 100 I
       Communities: src-as:65000:0 rtimport:10.255.162.157:0
       Accepted
       Localpref: 100
       Router ID: 10.255.162.157
       Indirect next hops: 1
         Protocol next hop: 1.1.1.2 Metric:
1
         Indirect next hop: 0xa6f1d00 - INH
```

-continued

```
Session ID: 0x0
        Indirect: path forwarding next hops:
1
        Next hop type: Router
        Next hop: 51.51.51.1 via
ge-1/1/2.0
        Session Id: 0x2957
        1.1.1.0/30 Originating RIB: inet.0
        Metric: 1 Node path count: 1
        Indirect: nexthops: 1
        Protocol Nexthop: 10.255.162.157 Metric: 1
        Indirect nexthop: 0xa6eeec0 1048574 INH
Session ID: 0x2974 Path forwarding nexthops link:
0xb922460
        Path inh link: 0x0
        Indirect path forwarding nexthops: 1
        Nexthop: 51.51.51.1 via ge-1/1/2.0
regress@PE12C#
```

The following is an example snapshot of primary and backup C-multicast source tree join routes:

```
regress@PE12C# run show route table vpna.mvpn.0 match-prefix
7:*
vpna.mvpn.0: 12 destinations, 12 routes (12 active, 0
holddown, 0 hidden)
+ = Active Route, - = Last Active, * = Both
7:10.255.162.157:0:65000:32:181.181.181.2:32:225.225.225.1/
240 ! Primary C-Multicast Source Tree Join Route
*[PIM/105] 10:19:29, metric 0
Multicast (IPv4) Composite
7:10.255.162.151:0:65000:32:182.182.182.2:32:225.225.225.1/
240 ! Backup C-Multicast Source Tree Join Route
* [PIM/105] 10:19:29, metric 0
Multicast (IPv4) Composite
regress@PE12C#
```

Figure 4:
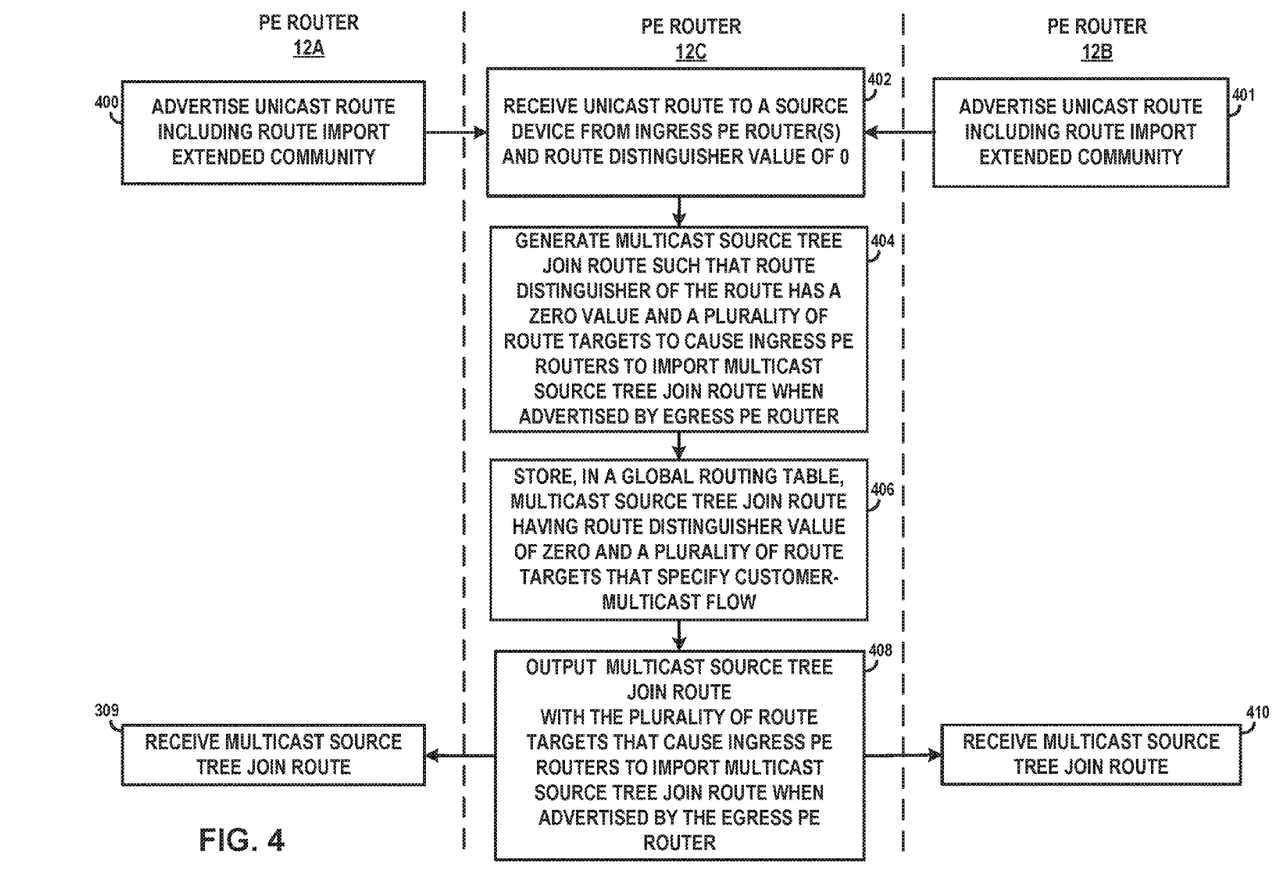
FIG. 4 is a flowchart illustrating another example operation of network devices in accordance with the techniques of this disclosure.

FIG. 4 is a flowchart illustrating another example operation of network devices in accordance with the techniques of this disclosure. FIG. 4 illustrates another example operation of devices for providing hot-root standby support for MPLS internet Multicast/Global Table Multicast. FIG. 4 will be described for purposes of example with respect to PE routers 12A-C in the example system 2 of FIG. 1 and FIG. 2. In the example of FIG. 4, PE router 12C may receive unicast routes to a source device from ingress PE routers, including Route Import Extended Communities that include, among other information, identifiers that uniquely identify the sources of the unicast routes. For example, PE router 12A may advertise to PE router 12C a unicast route with a Route Import Extended Community that specifies a unique identifier (e.g., IP address) for PE router 12A (400). PE router 12B may also advertise to PE router 12C a unicast route with a Route Import Extended Community that specifies a unique identifier for PE router 12B (401). Egress PE router 12C may receive the unicast routes to the source device 20 from ingress PE routers 12A and 12B (402). As stated above, when a PE router originates a MCAST-VPN route in support of Global Table Multicast (GTM), the Route Distinguisher (RD) field of that route's Network Layer Reachability Information (NLRI) must be set to zero (i.e., to 64 bits of zero). In the example of FIG. 4, PE router 12C may receive the unicast routes from ingress PE routers 12A and 12B that have a RD value of zero.

PE router 12C may then generate multicast source tree join routes having route distinguisher values of zero and a plurality of route targets to cause ingress PE routers to import multicast source tree join routes when advertised by egress PE router 12C (404). For example, unlike FIG. 3 where the upstream route distinguisher values are set to corresponding identifiers (e.g., IP addresses) of ingress PE routers 12A and 12B, ingress PE routers 12A and 12B set the upstream route distinguisher of the multicast source tree join route to zero. Rather, each of ingress PE routers 12A and 12B include a route target list in the multicast source tree join route, where the route target list includes the Route Import Extended Communities of ingress PE routers 12A and 12B. For instance, if the global routing table of PE router 12C includes IP addresses of both of PE routers 12A and 12B that are associated with source 20, then PE router 12C may include both the IP addresses of PE routers 12A and 12B in the route target list of the multicast source tree join route.

PE router 12C may store multicast source tree join routes for PE routers 12A and 12B that specify the customer-multicast flow sourced by source device 20 (406). In one example, egress PE router 12C may determine that the global table includes IP addresses of both PE routers 12A and 12B that are each associated with source 20 and generate multisource tree join routes that include a route target list including the Route Import Extended Communities of PE routers 12A and 12B. PE router 12C may store the generated multicast source tree join routes in a global routing table of egress PE router 12C.

Egress PE router 12C may output the multicast source tree join routes having a route target that causes the ingress PE routers to import multicast source tree join routes with the route target list to ingress PE routers 12A and 12B (408). In the example of FIG. 4, PE router 12C may output to ingress PE router 12A a first multicast source tree join route with route target list including the Route Import Extended Community of PE router 12A. Similarly, PE router 12C may output to ingress PE router 12B a second multicast source tree join route with route target list including the Route Import Extended Community of PE router 12B. Ingress PE routers may receive the corresponding multicast source tree join routes, including a route target list, from egress PE router 12C. For example, ingress PE router 12A may receive from egress PE router 12C the first multicast source tree join route and route target list with Route Import Extended Community of PE router 12A (409). Likewise, ingress PE router 12B may receive from egress PE router 12C the second multicast source tree join route and route target list with Route Import Extended Community of PE router 12B (410).

The following command-line interface (CLI) outputs illustrate example content in abridged and extensive form for unicast routes 22A, 22B of FIG. 1, stored to PE router 12C.

```
regress@PE12C# run show route 181.181.181.2 (← C-Source)
inet.0: 68 destinations, 85 routes (67 active, 0 holddown, 1 hidden)
+ = Active Route, - = Last Active, * = Both
181.181.181.0/30 *[BGP/170] 14:12:25, localpref 100, from 10.255.162.
151
AS path: 100 I, validation-state: unverified
> to 52.52.52.1 via ge-1/2/0.0, label-switched-path PE12C_to_PE12A
[BGP/170] 10:16:32, localpref 100, from 10.255.162.157
AS path.: 100 I, validation-state: unverified
> to 51.51.51.1 via ge-1/1/2.0, label switched-path PE12C_to_PE12B
regress@PE12C# run show route 181.181.181.2 (← C-Source) extensive
inet-0: 68 destinations, 85 routes (67 active, 0 holddown, 1 hidden)
181.181.181.0/30 (2 entries, 1 announced)
TSI:
KRT in-kernel 181.181.181.0/30 -> {indirect(1048579)}
Page 0 idx 0, (group CE12C type External) Type 1 val 0xa6ca944 (adv_
entry)
```

-continued

```
Advertised metrics:
   Nexthop: Self
   AS path: [65000] 100 I
   Communities: src-as:65000:0 rt-import:10.255.162.151:0
Path 181.181.181.0 from 10.255.162.151 Vector len 4. Val:0
      *BGP Preference: 170/-101
      Next hop type: Indirect, Next hop index: 0
      Address: 0xa5cd570
      Next-hop reference count: 6
      Source: 10.255.162.151
      Next hop type: Router, Next hop index: 630
      Next hop: 52.52.52.1 via ge-1/2/0.0,selected
      Label-switched-path PE12C_to_PE12A
      Label element ptr: 0xa5d1160
      Label parent element ptr: 0x0
      Label element references: 2
      Label element child references: 0
      Label element lsp id: 3
      Session Id: 0x2964
      Protocol next hop: 1.1.11.2
      Indirect next hop: 0xa6f1a80 1048579 INH
Session ID: 0x2970
      State: <Active Int Ext>
      Local AS: 65000 Peer AS: 65000
      Age: 14:12:35 Metric2: 1
      Validation State: unverified
      Task.: BGP_65000.10.255.162.151
      Announcement bits (3): 0-KRT 6-BGP_RT_Background
      7-Resolve tree 2
      AS path: 100 I
      Communities: src-as:65000:0
      rtimport:10.255.162.151:0
      Accepted
      Localpref: 100
      Router ID: 10.255.162.151
      Indirect next hops: 1
         Protocol next hop: 1.1.11.2 Metric: 1
         Indirect next hop: 0xa6f1a80 1048579 INH
         Session ID: 0x2970
         Indirect path forwarding next hops: 1
            Next hop type: Router
            Next hop: 52.52.52.1 via ge-1/2/0.0
            Session Id: 0x2964
      1.1.11.0/30 Originating RIB: inet.0
         Metric: 1 Node path count: 1
         Indirect nexthops: 1
            Protocol Nexthop: 10.255.162.151 Metric: 1
            Indirect nexthop: 0xa6ef780 1048582 INH
Session ID: 0x2960 Path forwarding nexthops link: 0xb922690
         Path inh link: 0x0
         Indirect path forwarding nexthops: 1 Nexthop: 52.52.52.1
via ge-1/2/0.0
      BGP Preference: 170/-101
      Next hop type: Indirect, Next hop index: 0
      Address: 0xa5cfc70
      Next-hop reference count: 3
      Source: 10.255.162.157
      Next hop type: Router, Next hop index: 631
      Next hop: 51.51.51.1 via ge-1/1/2.0, selected
      Label-switched-path PE12C_to_PE12B
      Label element ptr: 0xa5c6180
      Label parent element ptr: 0x0
      Label element references: 2
      Label element child references: 0
      Label element lsp id: 2
      Session Id: 0x2957
      Protocol next hop: 1.1.1.2
      Indirect next hop: 0xa6f1d00 - INH Session ID: 0x0
      State: <NotBest Int Ext>
      Inactive reason: Not Best in its group - Router ID
      Local AS: 65000 Peer AS: 65000
      Age: 10:16:42 Metric2: 1
      Validation State: unverified
      Task: BGP_65000.10.255.162.157
      AS path: 100 I
      Communities: src-as:65000:0 rtimport:10.255.162.157:0
      Accepted
      Localpref: 100
      Router ID: 10.255.162.157
      Indirect next hops: 1
         Protocol next hop: 1.1.1.2 Metric: 1
         Indirect next hop: 0xa6f1d00 - INH Session ID: 0x0
         Indirect path forwarding next hops: 1
            Next hop type: Router
            Next hop: 51.51.51.1 via ge-1/1/2.0
            Session Id: 0x2957
      1.1.1.0/30 Originating RIB: inet.0
         Metric: 1 Node path count: 1
         Indirect nexthops: 1
            Protocol Nexthop: 10.255.162.157 Metric: 1
            Indirect nexthop: 0xa6eeec0 1048574 INH
Session ID: 0x2974 Path forwarding nexthops link: 0xb922460
         Path inh link: 0x0
         Indirect path forwarding nexthops: 1
            Nexthop: 51.51.51.1 via ge-1/1/2.0
```

The following CLI output illustrates example content for multiple C-multicast source tree joins according to techniques described with respect to FIGS. 3A-3B:

```
regress@PE12C# run show route table vpna.mvpn.0 match-prefix 7:*
vpna.mvpn.0: 12 destinations, 12 routes (12 active, 0 holddown, 0 hidden)
+ = Active Route, - = Last Active, * = Both
7:10.255.162.157:0:65000:32:181.181.181.2:32:225.225.225.1/240
   (Primary C-Multicast Source Tree Join Route)
*[PIM/105] 10:19:29, metric 0
Multicast (IPv4) Composite
7:10.255.162.151:0:65000:32:182.182.182.2:32:225.225.225.1/240
   (Backup C-Multicast Source Tree Join Route)
*[PIM/105] 10:19:29, metric 0
Multicast (IPv4) Composite
```

The following CLI output illustrates example content for a C-multicast source tree join that includes multiple route targets according to techniques described with respect to FIG. 4:

```
regress@PE12C# run show route table vpna.mvpn.0 match-prefix 7:*
vpna.mvpn.0: 12 destinations, 12 routes (12 active, 0 holddown, 0 hidden)
+ = Active Route, - = Last Active, * = Both
7:0:0:65000:32:181.181.181.2:32:225.225.225.1/240
*[PIM/105] 10:19:29, metric 0
Multicast (IPv4) Composite Communities: target:10.255.162.157:0
target:10.255.162.151:0
```

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

What is claimed is:

1. A method comprising:
   receiving, by an egress provider edge (PE) router of a multi-protocol label switching (MPLS) network, a first unicast route to a source device of a customer site that is attached to a first ingress PE router and a second ingress PE router, the first unicast route originated by the first ingress PE router and having a route distinguisher value of zero;
   receiving, by the egress PE router, a second unicast route to the source device, the second unicast route originated by the second ingress PE router and having a route distinguisher value of zero;
   outputting, by the egress PE router to the first ingress PE router, a first multicast source tree join route that specifies a customer-multicast flow sourced by the source device, the first multicast source tree join route having a first route distinguisher value; and
   outputting, by the egress PE router to the second ingress PE router, a second multicast source tree join route that specifies the customer-multicast flow sourced by the source device, the second multicast source tree join route having a second route distinguisher value different than the first route distinguisher value.

2. The method of claim 1,
   wherein outputting the first multicast source tree join route further comprises outputting, by the egress PE router, the first multicast source tree join route having a first route target that causes the first ingress PE router to import the first multicast source tree join route to a global routing table of the first ingress PE router and send first multicast traffic from the source device to the egress PE router; and
   wherein outputting the second multicast source tree join route further comprises outputting, by the egress PE router, the second multicast source tree join route having a second route target that causes the second ingress PE router to import the second multicast source tree join route to a global routing table of the second ingress PE router and send second multicast traffic from the source device to the egress PE router.

3. The method of claim 2,
   wherein the first route target is drawn from a Route Import Extended Community value of the first unicast route, and
   wherein the second route target is drawn from a Route Import Extended Community value of the second unicast route.

4. The method of claim 1,
   wherein the first route distinguisher value comprises a value of a Route Import Extended Community of the first unicast route, and
   wherein the second route distinguisher value comprises a value of a Route Import Extended Community of the second unicast route.

5. The method of claim 4,
   wherein the first route distinguisher value comprises an IP address of the first ingress PE router included in the Route Import Extended Community of the first unicast route, and
   wherein the second route distinguisher value comprises an IP address of the second ingress PE router included in the Route Import Extended Community of the second unicast route.

6. The method of claim 1, further comprising:
   storing, by the egress PE router in response to determining the route distinguisher value is zero for the first and second unicast routes, the first and second unicast routes to a global routing table that is not specific to any virtual private network.

7. The method of claim 1, wherein the first and second unicast routes are received using BGP Add-Path procedures.

8. The method of claim 1, wherein the first and second multicast source tree join routes comprise C-Multicast routes, and wherein the first and second multicast source tree join routes specify the customer-multicast flow by specifying the same (C-S, C-G) pair.

9. The method of claim 1, wherein the egress PE router is operating in Hot-Standby Mode with respect to a first multicast stream and a second multicast stream from the source device.

10. A method comprising:
    receiving, by an egress provider edge (PE) router of a multi-protocol label switching (MPLS) network, a first unicast route to a source device of a customer site that is attached to a first ingress PE router and a second ingress PE router, the first unicast route originated by the first ingress PE router and having a route distinguisher value of zero;
    receiving, by the egress PE router, a second unicast route to the source device, the second unicast route originated by the second ingress PE router and having a route distinguisher value of zero; and
    outputting, by the egress PE router to the first ingress PE router and the second ingress PE router, a multicast source tree join route that specifies a customer-multicast flow sourced by the source device, the multicast source tree join route having a route distinguisher value of zero and a plurality of route targets to cause each of the first ingress PE router and the second ingress PE router to import the multicast source tree join route when advertised by the egress PE router.

11. The method of claim 10, wherein the plurality of route targets comprises IP addresses of the first and second ingress PE routers.

12. The method of claim 10, wherein the plurality of route targets are taken from corresponding Route Import Extended Communities of the first and second unicast routes.

13. The method of claim 10, further comprising:
storing, by the egress PE router in response to determining the route distinguisher value is zero for the first and second unicast routes, the first and second unicast routes to a global routing table that is not specific to any virtual private network.

14. The method of claim 10, wherein receiving the first and second unicast routes are received based on BGP Add-Path procedures.

15. The method of claim 10, wherein the first and second multicast source tree join routes are C-Multicast routes, and wherein the first and second multicast source tree join routes specify the customer-multicast flow by specifying the same (C-S, C-G) pair.

16. The method of claim 10, wherein the egress PE router is operating in Hot-Standby Mode with respect to the first multicast stream and the second multicast stream.

17. A provider edge (PE) router comprising:
a forwarding unit coupled to one or more network interface cards;
a routing unit comprising at least one processor operably coupled to a memory, the routing unit configured to:
receive a first unicast route to a source device that is attached to a first ingress PE router and a second ingress PE router, the first unicast route originated by the first ingress PE router and having a route distinguisher value of zero;
receive a second unicast route to the source device, the second unicast route originated by the second ingress PE router and having a route distinguisher value of zero;
output, to the first ingress PE router, a first multicast source tree join route that specifies a customer-multicast flow sourced by the source device, the first multicast source tree join route having a first route distinguisher value; and
output, to the second ingress PE router, a second multicast source tree join route that specifies the customer-multicast flow sourced by the source device, the second multicast source tree join route having a second route distinguisher value different than the first route distinguisher value.

18. The provider edge router of claim 17,
wherein, to output the first multicast source tree join route, the routing unit is further configured to output the first multicast source tree join route having a route target that causes the first ingress PE router to import the first multicast source tree join route to a global routing table of the first ingress PE router and send first multicast traffic from the source device to the egress PE router; and
wherein, to output the second multicast source tree join route, the routing unit is further configured to output the second multicast source tree join route having a route target that causes the second ingress PE router to import the second multicast source tree join route to a global routing table of the second ingress PE router and send second multicast traffic from the source device to the egress PE router.

19. A system comprising:
a multicast source device of a first customer site;
a multicast receiver device of a second customer site;
an egress provider edge (PE) router on a multi-protocol label switching (MPLS) network and attached to the second customer site; and
a first ingress PE router and second ingress PE router attached to the first customer site,
wherein the egress PE router is configured to:
receive a first unicast route to the multicast source device, the first unicast route originated by the first ingress PE router and having a route distinguisher value of zero;
receive a second unicast route to the multicast source device, the second unicast route originated by the second ingress PE router and having a route distinguisher value of zero;
output, to the first ingress PE router, a first multicast source tree join route that specifies a customer-multicast flow sourced by the source device, the first multicast source tree join route having a first route distinguisher value; and
output, to the second ingress PE router, a second multicast source tree join route that specifies the customer-multicast flow sourced by the source device, the second multicast source tree join route having a second route distinguisher value different than the first route distinguisher value.

20. The system of claim 19,
wherein, to output the first multicast source tree join route, the egress PE router is further configured to output the first multicast source tree join route having a first route target that causes the first ingress PE router to import the first multicast source tree join route to a global routing table of the first ingress PE router and send first multicast traffic from the source device to the egress PE router; and
wherein, to output the first multicast source tree join route, the egress PE router is further configured to output the second multicast source tree join route having a second route target that causes the second ingress PE router to import the second multicast source tree join route to a global routing table of the second ingress PE router and send second multicast traffic from the source device to the egress PE router.

* * * * *